US010552095B1

(12) United States Patent
Lawson et al.

(10) Patent No.: US 10,552,095 B1
(45) Date of Patent: Feb. 4, 2020

(54) BIN PACKING IN 3D PRINTERS

(71) Applicant: Wiivv Wearables Company, San Diego, CA (US)

(72) Inventors: Colin M. Lawson, Vancouver (CA); Michael C. Salmon, West Vancouver (CA); Carly M Fennell, Vancouver (CA); Christopher W. Bellamy, Vancouver (CA); Amy J. Vanden Eynde, Vancouver (CA); Christopher M. Owen, San Diego, CA (US); Shamil N. Hargovan, San Jose, CA (US); Hsiao Ting Lin, Coquitlam (CA); Aron Tremble, North Vancouver (CA)

(73) Assignee: Wiivv Wearables Inc., Vancouver (CA)

( * ) Notice: Subject to any disclaimer, the term of this patent is extended or adjusted under 35 U.S.C. 154(b) by 0 days.

(21) Appl. No.: 16/192,762

(22) Filed: Nov. 15, 2018

(51) Int. Cl.
| | |
|---|---|
| G05B 19/402 | (2006.01) |
| G06F 3/12 | (2006.01) |
| B33Y 50/02 | (2015.01) |
| B33Y 10/00 | (2015.01) |
| G05B 19/4155 | (2006.01) |
| G05B 19/4099 | (2006.01) |
| G06F 17/50 | (2006.01) |
| G06F 16/51 | (2019.01) |
| G05B 15/02 | (2006.01) |

(52) U.S. Cl.
CPC ............ *G06F 3/1204* (2013.01); *B33Y 10/00* (2014.12); *B33Y 50/02* (2014.12); *G06F 3/126* (2013.01); *G05B 15/02* (2013.01); *G05B 19/4099* (2013.01); *G05B 19/4155* (2013.01); *G05B 2219/49023* (2013.01); *G06F 16/51* (2019.01); *G06F 17/5009* (2013.01)

(58) Field of Classification Search
CPC ..................................................... G06F 3/1204
See application file for complete search history.

(56) References Cited

U.S. PATENT DOCUMENTS

| | | | | |
|---|---|---|---|---|
| 4,643,307 A | * | 2/1987 | Wilkinson | B65D 85/20 206/443 |
| 6,926,947 B1 | * | 8/2005 | Seckel | B32B 1/00 206/585 |
| 6,980,934 B1 | * | 12/2005 | Sadovnik | G06F 17/5004 206/505 |
| 9,840,347 B1 | * | 12/2017 | Linnell | B65D 81/051 |
| 2011/0313878 A1 | * | 12/2011 | Norman | G06Q 30/06 705/26.5 |
| 2018/0024517 A1 | * | 1/2018 | Halperin | G05B 19/4099 700/98 |
| 2018/0297266 A1 | * | 10/2018 | Linnell | G05B 15/02 |
| 2018/0329658 A1 | * | 11/2018 | Collomp | B29C 64/393 |

* cited by examiner

*Primary Examiner* — Mark A Connolly
(74) *Attorney, Agent, or Firm* — Perkins Coie LLP; Jordan M. Becker

(57) ABSTRACT

Disclosed herein is a technique to efficiently pack a print volume of 3D printers having print jobs with a large number of objects. The technique positions unique objects that adhere to a similar structural pattern more closely when the degree of variation between the objects is small. Thus, while each object is unique, a greater extent of similarity between the objects causes a given group of objects to be positioned more closely to one another in the print area of the 3D printer.

27 Claims, 13 Drawing Sheets

BIN PACKING IN 3D PRINTERS

CROSS REFERENCE TO RELATED APPLICATIONS

This application is related to the application titled "PRINT JOB DISTRIBUTION ACROSS A NETWORK OF 3D PRINTERS, filed Nov. 15, 2018, Ser. No. 16/192,772.

TECHNICAL FIELD

This disclosure relates to optimizing output of a 3D printer. More particularly, this disclosure relates to an improved technique for arranging a large number of objects in a print volume for 3D printing.

BACKGROUND 3D printers are devices that generate three dimensional objects through additive manufacturing ("3D printing"). A 3D printer creates ("prints") objects that are arranged in a defined printable volume specified by an input file to the printer, in a manner analogous to how a conventional paper-and-ink printer receives a 2D electronic document as input. The printing volume is limited, so it is advantageous to fit as many objects as possible into it, for both production volume efficiency (more output for a given printer and period of time) as well as production cost (less wasted material and energy per printed piece). Using brute force computational techniques (e.g., testing each object across a plurality of positions, placed in relation to a plurality of different objects, where each object can have any of a plurality of orientations relative to one another) to determine an optimal configuration of a large number of objects in space has a prohibitive computational complexity. The problem is effectively unmanageable without mitigative measures.

Figure 1A:
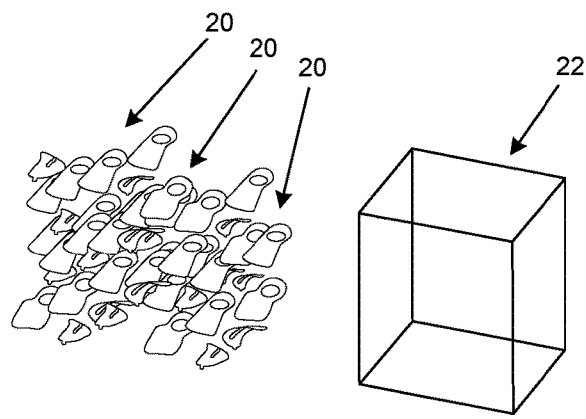
FIG. 1A is an illustration of a number of computer-aided design ("CAD") objects and a volume.

DETAILED DESCRIPTION 3D printer nesting software is designed to "nest" or "pack" irregular objects of known geometries into a known volume, for use as input to a 3D printer. The known volume matches the printable volume of a 3D printer. In circumstances where the objects, though irregular, follow a structural pattern (such as mass production of wearable objects customized to their purchasers) improvements can be made to the packing/nesting of those objects. Custom objects that follow a structural pattern include both predictable dimensions (e.g., all shirts have two sleeves, all pants have two legs, etc.) and unpredictable dimensions (e.g., the width of the chest of a shirt, the length of the legs on pants, etc.).

Predictable portions of the objects can be used to reduce the complexity of the packing problem. Where each object has known or predictable dimensions, those dimensions enable a relatively small number of objects to be more optimally aligned with one another as representative of all the objects. The unpredictable portions may vary in recurring ways (e.g., the size of certain portions or extremities of the objects). Arranging the objects such that objects that vary to a similar degree are placed near one another further optimizes the packing (where some criterion for "similar" is specified).

In operation, a machine learned packing model is trained to firstly identify a geometric shape as one of the known objects, then position that object within an array of other objects based on a scoring system. The scoring system is based on known configurations regarding how the shapes fit together efficiently. For example, two concave objects of similar concavity will fit well when placed in the same upright position directly above and below each other, and therefore these objects would receive a high comparison score. The scoring system allows the packing model to quickly identify which objects should be placed near each other, how they should be aligned in relation to one another, as well as how close they can be positioned.

A specific example entails custom footwear products, such as shoe insoles. While each insole is completely unique and custom to a given customer's anatomy, a batch of insoles for different customers will vary in known ways based on the size of the foot and the extent of the foot arch. These variations can be utilized to make informed decisions about where the insoles are best placed in the 3D volume.

In a simplified example, one high scoring decision the model may make is to place two, left foot, size 10 insoles with shallow arches directly above and below one another. Once the initial location arrangement is made, processing power can be focused on smaller movement iterations to increase packing efficiency. Smaller movement iterations are close to fixed in number and significantly reduce the computational complexity of the packing problem. An analogy of the solutions is nesting bowls in a household cupboard; it isn't efficient to place a small bowl below a large bowl, then back to a small bowl above that. Although a packing scheme using randomized positioning could, in theory, come up with the same solution given infinite computing power and processing time, the number of computational iterations quickly becomes infeasible when hundreds or thousands of objects need to be nested. Even when isolated to two objects that require nesting together, there are thousands or even millions of combinations possible for their geometric arrangement.

FIG. 1A is an illustration of a number of computer-aided design ("CAD") objects 20 and a volume 22, which may represent a 3D print volume. The figure depicts the initial state of the bin packing problem. CAD objects 20 are embodied as digital object files. The filetype/format for a CAD object 20 varies and include a number differences. Examples of file types include OBJ, STL, VRML, X3G, PLY, FBX, and 3MF files. OBJ is an open file format that represents 3D geometry. OBJ is a common file used in 3D printing because many design software exports to OBJ and most printers accept OBJ as a printable file. STL files are a standard file type that interfaces between (CAD) software and 3D printers. VRML (or WRL) files are commonly used when a 3D model has color and a user wants to transfer that color to the print.

X3G is a file type that interfaces with the MakerBot 3D™ printer. MakerWare™ and ReplicatorG™ will output an X3G file. PLY files are often scanner-generated models and will have to be imported into some type of design software before sending to a 3D printer to print. FBX is a file format owned by Autodesk™. FBX is used to efficiently exchange data between Autodesk programs including 3ds Max™, Autodesk™ and Maya™, 3MF (3D Manufacturing Format) is a file format standard developed and published by the 3MF Consortium based in XML and in addition to geometric structure, includes information concerning materials and colors (among other specifications). Despite filetype used, an additive manufacturing device ("3D printer"), receives a plurality of CAD objects 20 as print jobs and organizes the CAD objects 20 into a volume 22 that corresponds to the 3D printer's respective printable area.

In the present example, the CAD objects 20 each follow a fixed number of similar structural patterns. Depicted in the figure, the CAD objects 20 are any of a custom full-length insole, a custom three-quarter length insole, or a custom arch insert for a sandal. Each of the CAD objects 20 follow a structural pattern. In the present example, there are a number of relevant structural patterns. At the highest level, all the CAD objects 20 are related to footwear and contain some structural similarities, such as including an arch, and having a right and left side. At a secondary level, the 3 types of CAD object 20 follow secondary structural patterns. For example, each of the full-length insoles as a heel cup, an arch, a right and left side, and a foot bed.

Despite the relative structural similarity between all of the CAD objects 30, each is unique and customized for a particular user. The manner of customization is predictable for each of the CAD objects 20. Some dimensions change more than others. For example, from user to user, the overall size (length and width) and the size of the foot arch changes most significantly.

Figure 1B:
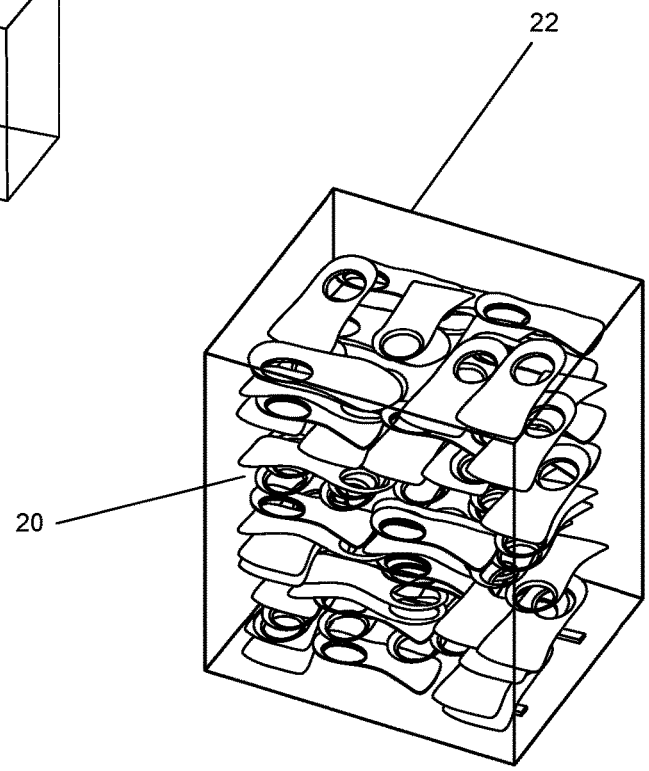
FIG. 1B is an illustration of the computer-aided design ("CAD") objects positioned in the volume in a sub-optimal configuration.

FIG. 1B is an illustration of the CAD objects 20 positioned in the volume 22 in a sub-optimal configuration. Depicted is a result of packing each of the CAD objects 20 into the volume 24 using a modified brute force technique. In some embodiments, modified brute force places the CAD objects 20 one at a time, and without consideration of the similarities between each of the CAD objects 20. The CAD objects 20 are not inspected by the relevant packing module for any sort of overarching scheme or pattern across the entire set of CAD objects 20. The result is a somewhat randomized placement that is heavily dependent on the order that the system places each CAD object 20.

Modified brute force techniques can vary but include some similar steps. Those steps include: placement of each object one at a time, followed by a tightening step where smaller movements are made in an attempt to improve upon a "first draft" packing. Analyzing each object in every orientation compared to every other object respectively in every orientation is exceedingly computationally complex. Thus, some modified brute force methods of placement use heuristics to place objects. The heuristics may set thresholds for what merits an acceptable packing density. Once the acceptable packing density is achieved, the system stops looking for additional orientations. Other techniques use bounding boxes of the CAD objects 20 to simplify the objects' respective geometries and simplify the problem. Even with a number of optimizations, modified brute force techniques require large amounts of processing power and can take a significant amount of time to process packing configurations.

Figure 1C:
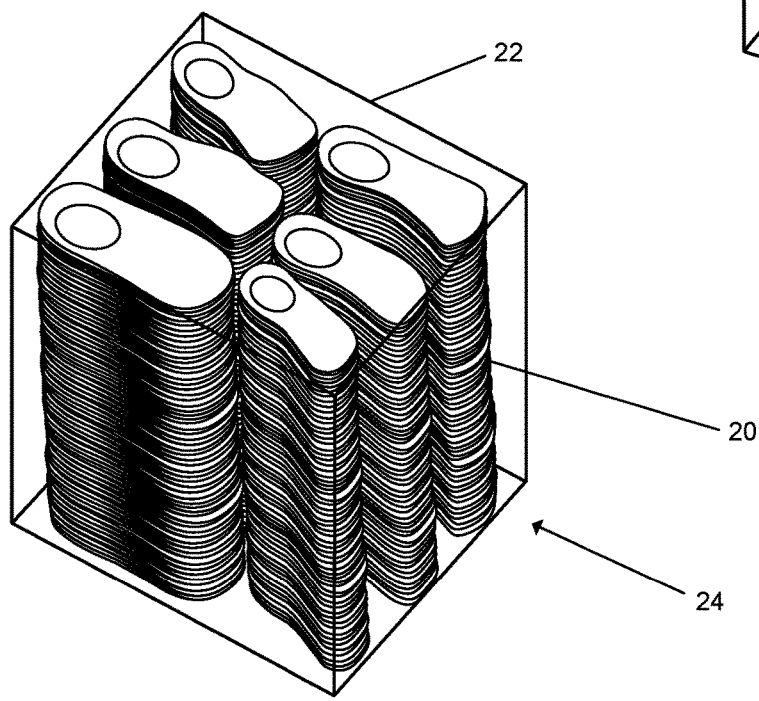
FIG. 1C is an illustration of the computer-aided design ("CAD") objects positioned in the volume in a more optimal configuration.

FIG. 1C is an illustration of the CAD objects 20 positioned in the volume 22 in a more optimal configuration. The more optimal configuration is obtained using a repeating alignment pattern technique and a like-with-like scoring technique. The repeating alignment pattern is determined based on an analysis of all of the CAD objects 20 that finds relative similarities across all CAD objects 20. The relative similarities are used to reduce the complexity of the alignment problem to a limited number of the objects. The analysis to determine similarities across all objects can shift the problem from packing a plurality of unique objects to an analog of a different, less computationally complex, problem: packing a plurality of identical objects.

For the example using full-length custom insoles, an ideal repeating alignment pattern is: nested in one another using parallel alignment, organized into object columns 24. Once determined, the repeating alignment pattern enables significant improvements to computational complexity because the orientation of each object relative to each other object is set and does not have to be re-computed. Placement of a sorted list of CAD objects 20 in the object columns 24 is reduced to a worst-case scenario of linear complexity.

An embodiment of sorting or pairing the list of CAD objects 20 is important to reducing the complexity of the bin packing problem. In this example, the software first identifies each object as being one of the three known geometric forms. The system knows the principles of how certain shapes will efficiently fit together based on taught machine learning/neural network models (e.g., that concavity fits together with convexity), and scores each shape based on that criteria. For example, with respect to full length insoles, the scoring contains an arch height rating, as well as an overall length rating (among other criteria). The system knows that two full-length insole products that have a similar arch height rating will fit vertically above each other efficiently. The objects will only attempt to be placed/paired/sorted with one another if they also score similarly in overall length.

This scoring system is expanded to all other criteria that the system has been taught about the given structural pattern (e.g., full length insole shape). Once sorted, the system knows which objects will tend to fit well together and in what orientation they fit well together. The system uses this knowledge as a starting point for placing the objects and evaluating how dense the overall nesting will be.

Nesting may be performed across the entire set of CAD objects 20 in addition to across any given pair of CAD objects 20. For example, the object columns 24 may nest to one another. An object column 24 may by organized from greatest width to narrowest, then positioned next to an object column 24 having a reverse configuration (e.g., narrowest width to greatest width).

FIGS. 2A through 2D illustrate a generic bin packing example, without consideration of a specific geometry, that can be applied to any suitable set of CAD objects 20.

Figure 2A:
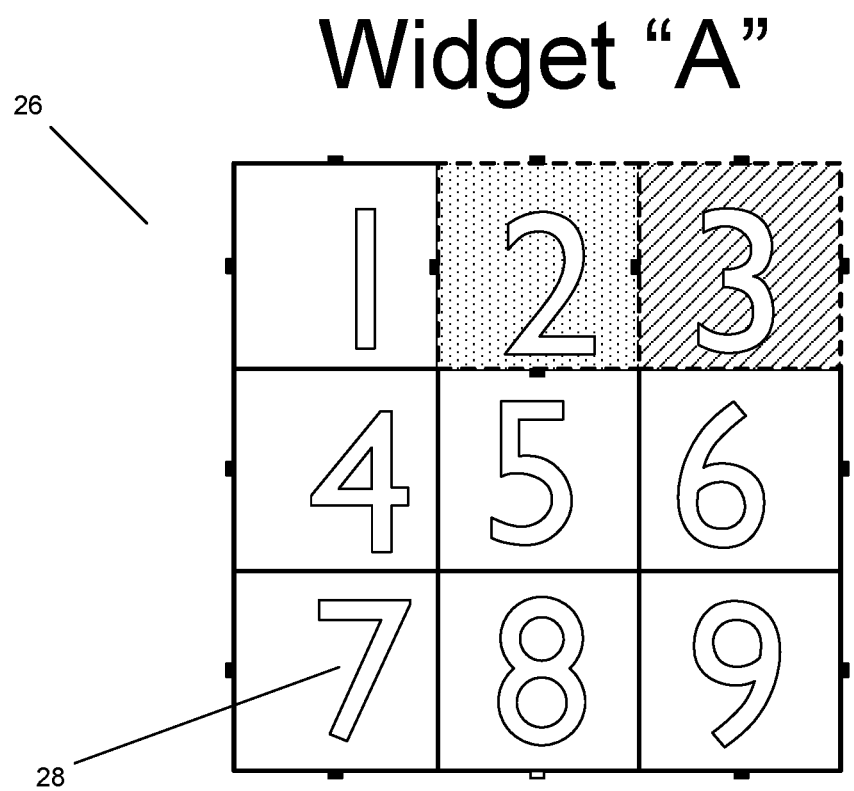
FIG. 2A is an illustration of a generic CAD object analyzed in an arbitrary number of dimensions.

FIG. 2A is an illustration of a generic CAD object, a widget 26, analyzed in an arbitrary number of dimensions 38. As discussed with respect to custom insoles, the system performs an analysis of a set of CAD objects 20. The pictured widget 26 has an arbitrary geometry. The system analyzes each widget 26 and builds a pattern on where the widgets 26 change significantly, and how they change. For example, the widget 26 is probed across nine aspects 28 (labeled 1 through 9).

Figure 2B:
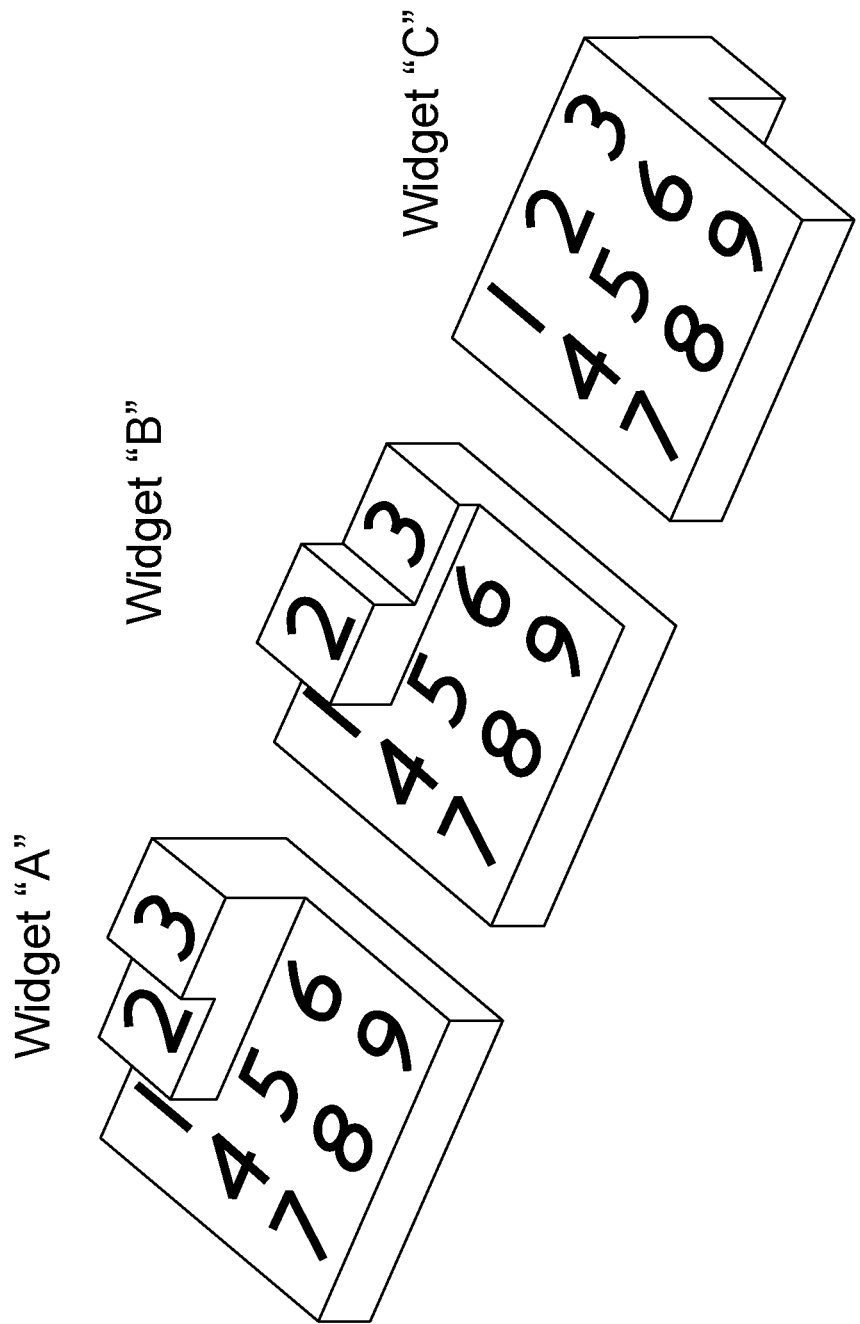
FIG. 2B is an illustration of detected variation of the generic CAD object.

FIG. 2B is an illustration of detected variation of the widget 26. Once analyzed, the system finds that the widgets 26 vary in thickness mainly in aspects 2 and 3. The system further determines that the pictured widget 26 is found to have consistent length and width.

Figure 2C:
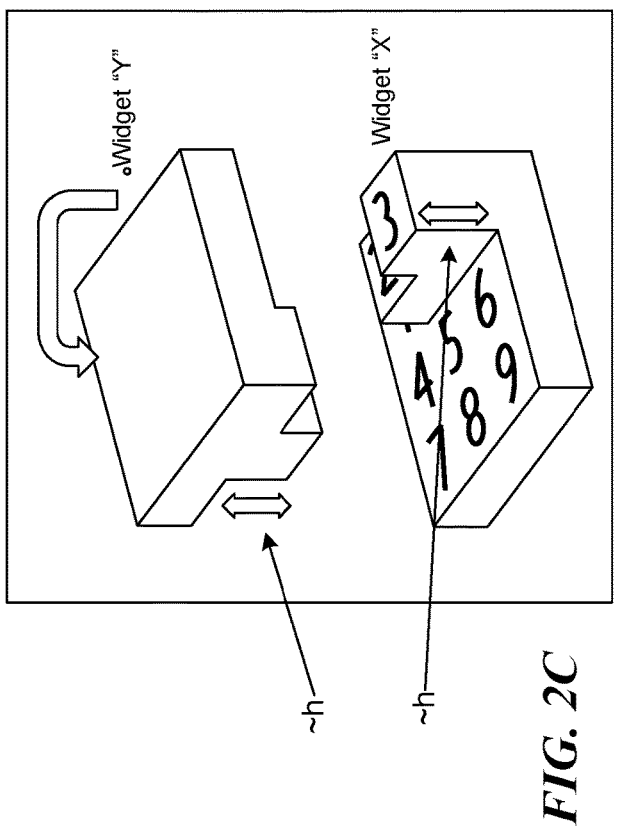
FIG. 2C is an illustration of an alignment pattern for the generic CAD object.

FIG. 2C is an illustration of an alignment pattern for the generic CAD object. In the widget example, as a result that variation is concentrated in less than 50% of the planar area of the widgets 26, the system determines that stacking the widgets vertically, in a "head-to-toe" sequence will be efficient (e.g., every second widget is flipped). There are a number of ways to configure the system to determine the repeating stacking or orientation pattern.

For example, the orientation pattern may be determined based on a trained AI model (including machine learning, convolutional neural networks, deep learning networks, or other equivalents). The model is trained on principles of nesting or stacking. The model can determine that a given widget 26 is similar to some other known shape. The known shape is stacked in a certain predetermined fashion (e.g., concave shapes nest well with convex shapes). In some embodiments, a given widget 26 is identified as relating to multiple known shapes across different aspects. "known shapes" can refer to entire volumetric shapes, or three-dimensional surfaces belonging to a larger shape. Once the model is trained, a number of representative shapes are aligned by the model in a pattern that uses space most efficiently as determined by the model.

Representative shapes refer to average shapes across the set of widgets. As described previously, a considerable portion of the widgets 26 do not vary from instance to instance. For this portion, the representative geometry is consistent. Where the widget 26 varies, an average can be determined based on coordinates of relevant vertices across the widget 26. In some embodiments, custom widgets 26 are defined by a set of vertices and connecting edges. Where smoother curves are present, a greater number of vertices are used. The use of representative shapes significantly reduces the computational complexity of the bin packing problem. Determining a packing solution for a plurality of identical shapes is notably less complex than determining a packing solution for a plurality of unrelated shapes. Identical shapes pose a simpler problem because the problem is limited to the aspects of the single shape as opposed to use of N shapes that each have M aspects to compare.

The number of representative shapes used to determine the orientation pattern varies by embodiment. In some embodiments, the number starts at two, and increments after the best orientation pattern is determined based on the number of shapes used (e.g., a pattern is determined for the use of two shapes, three shapes, four shapes . . . n shapes). The orientation pattern is such that it may be repeated in each direction infinitely until a given print job runs out of volume, or CAD objects to print. In some embodiments, the incrementing of the shapes used to determine the orientation pattern ends at a fixed or predetermined number (e.g., 5-10). In some embodiments, the incrementing of shapes used to determine the orientation pattern ends when a trend in volumetric efficiency in the result of incrementing shapes levels off, or declines. In some embodiments, the incrementing of shapes used to determine the orientation pattern ends when a total volume of the orientation pattern reaches a threshold volume. The threshold volume may be a predetermined figure or based on the size of a given 3D printer's print area. For example, if a given orientation pattern is too large to be repeated in the print area available, the pattern is not an effective one despite the volumetric efficiency.

In some embodiments, a representative shape is not used to determine an orientation pattern. Based on a determined style of variance across the widgets 26, the system determines an orientation pattern that pairs up the widgets 26 (e.g., Widget Y and Widget X based on aspect 3 extruding to a similar height "h").

In place of a machine learned model, a set of heuristics may be used to similar result. A set of rules are executed that direct positioning of the representative shape according to other copies of the representative shape. The set of heuristic rules include potential methods of nesting different sort of shapes and rules to classify shapes (e.g., identify concave and convex shapes).

In some embodiments, a simulated annealing process is used to determine the orientation pattern. Simulated annealing is a probabilistic technique for approximating the global optimum of a given function. Specifically, it is a metaheuristic to approximate global optimization in a large search space for an optimization problem. Simulated annealing starts by randomly placing the representative shapes and performing movement iterations. Then, during each iteration, the system randomly mutates the position or rotation of one of the representative shapes. If a collision is detected, the system tries something else. Then the system computes a score based on the total volume occupied by the representative shapes.

Figure 2D:
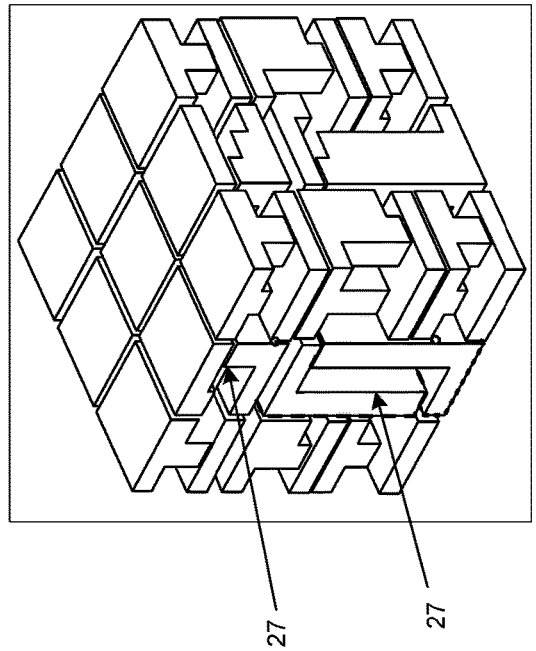
FIG. 2D is an illustration of pairings and positions within a repeating orientation pattern.

FIG. 2D is an illustration of pairings and positions within a repeating orientation pattern. Once an alignment pattern is determined for representative shapes, placement for the actual shapes is determined. As depicted, the widgets 26 vary in aspects 2 and 3, but each varies to a different extent. Each of the plurality of widgets 26 is organized into pairs 27 with a similarly varied widget 26. Similarly varied refers to the extent or degree to which the variable regions different from the representative shape. As shown in FIG. 2D, pairing two widgets 26 that extrude to a similar extent is efficient to minimize the dead space between the two. Therefore, the widgets 26 shown paired with one another will score well together. FIG. 2D shows widgets 26 with long aspects 2 and 3 paired together and widgets 26 with short aspects 2 and 3 paired together. The use of pairs 27 in the given example is based on a volume efficient orientation pattern for this example. Where an orientation pattern uses a greater number (3+) of representative shapes, a matching number of actual shapes are paired together to determine positioning in the orientation pattern. Once each of the widgets 26 are paired to other widgets 26 that have a similar degree of variance, each widget 26 is placed in the repeating orientation pattern. Placement requires very little computation, and this step executes with linear complexity (i.e., complexity proportional to the number of objects placed).

In some embodiments, pairing of CAD objects 20 is not performed on an exclusive one-to-one basis. For example, with respect to the previously discussed custom footwear objects, a given CAD object 20 is paired with the object positioned above and the object positioned below. However, the object positioned above the subject object does not need to have a paired relationship with the object positioned below the subject object. In the custom footwear item example, insoles are positioned proximate to other insoles that have similar arches. Similarly, the stacks of insoles may be configured to alternate small to large shoe size from bottom to top and vice versa.

Depending on the size of a given print order, there may be more CAD objects 20 than may fit in a single cycle of the 3D printer. In such cases, a single printer cycle may include only insoles having high arches, and a subsequent printer cycle may include only insoles having low arches. In some embodiments, the system coordinates the bin packing for multiple printer cycles simultaneously. The set of insoles may be expressed as an ordered list that is based on the similarity of the degree of variation across all the insoles and the known size of the available 3D printer's print area. The placement of the insoles into print cycles is performed in a snaked fashion extracting the next available insole for placement until none remain. To further parallelize the process, multiple 3D printers execute cycles simultaneously in order to complete a large print job faster.

Figure 3:
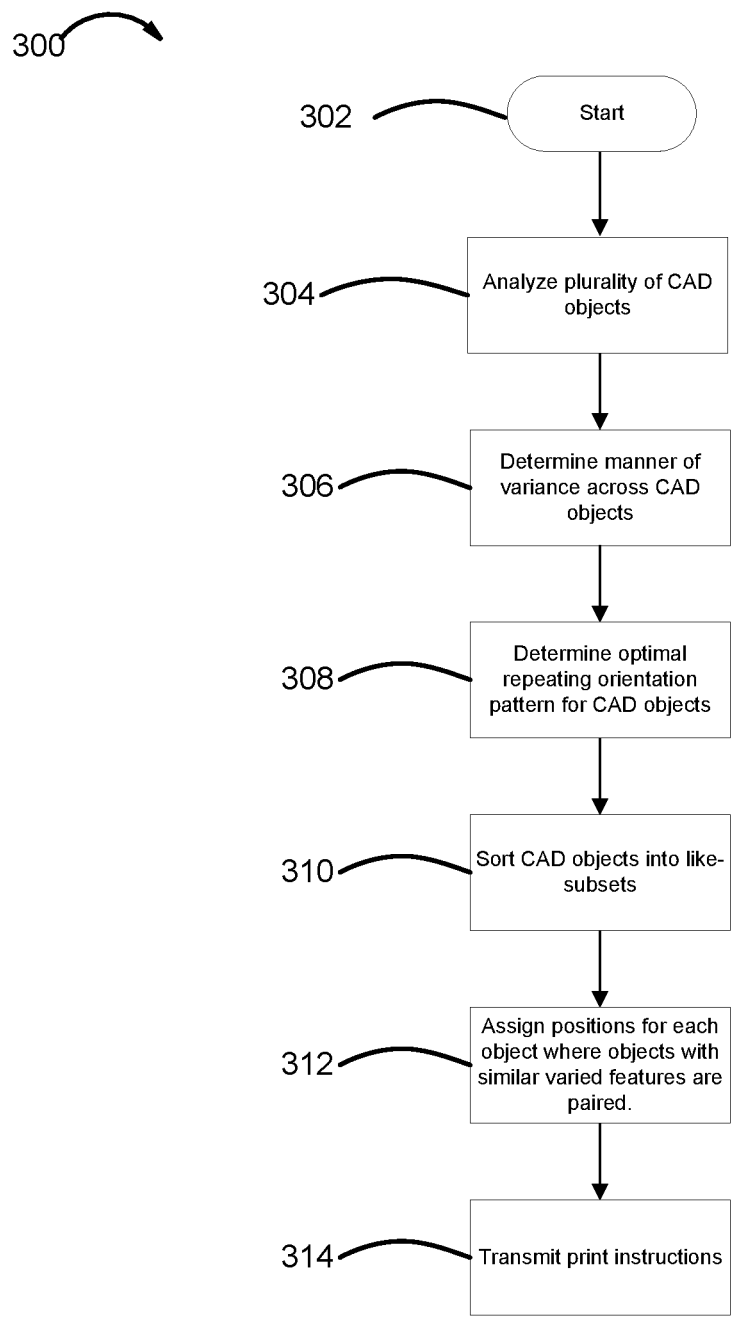
FIG. 3 is a flow chart illustrating a method of placing CAD objects into a volume.

FIG. 3 is a flow chart illustrating a method of placing CAD objects into a volume. In step 304, the system analyzes each of a set of CAD objects. The set of CAD objects are each a unique variation on a similar structural pattern or design. Step 304 is used to determine the general geometries that are involved in the print job. In step 306, the system determines a manner of variance across all CAD objects. In other words, the system determines what portions of the CAD objects are reliably similar across each object and which portions vary. Additionally, the system determines the manner and degree in which those portions or aspects vary.

In step 308, the system determines an volume-efficient repeating orientation pattern for CAD objects based on the geometries and variances present in the set of CAD objects. Methods for determining the repeating orientation pattern vary from embodiment to embodiment. In some embodiments, a trained machine learning model uses the style and degree of variance to assign an orientation pattern. In some embodiments, a representative CAD object having average characteristics from the set of CAD objects is arranged with copies of itself based any of a trained machine learning model, preprogramed heuristics, or simulated annealing.

In step 310, the system sorts the set of CAD objects into like subsets. Each subset is an iteration of the repeating orientation pattern. The structure of the like subset depends on the determined orientation pattern. In some orientation patterns, a like subset is a pair, a triplet, a quadruplet, and so on. In some orientation patterns, a like subset is a sorted list of the CAD objects where each CAD object is positioned based on its closest neighbors in the orientation pattern (e.g., those objects positioned above and below, and in some cases left and right). Each like subset is determined based on the degree of variance in CAD objects, where CAD object that vary to a similar degree are sorted into like subsets (e.g., matching like with like). In some embodiments, a like subset is a pair between two or more CAD objects that are placed proximate or adjacent to one another. Proximate in this case may refer to CAD object within one to several positions away in the orientation pattern. In cases where the number of CAD objects is greater than those that may be printed in a single print cycle, proximate may refer to positioning in the same print cycle.

In step 312, the system assigns positions for each CAD object in the orientation pattern where objects with similar varied features are paired. Based on the sorting of CAD objects, and the print area available the CAD objects are placed in a representative volume. In some embodiments, the objects are placed in a snaking fashion. In some embodiments, the objects are placed in their respective like subsets, each subset is positioned one at a time. In some embodiments, the subsets are each analyzed for shape and overall volume. For example, where two "tall" subsets do not fit into a given print area, one "tall" subset, is placed near a "short" subset based on the total height of the print area. In step 314, once all the CAD objects are positioned into representative volumes of the relevant print area(s) of available printers, the system transmits print instructions toward the 3D printer or network of 3D printers.

Figure 4:
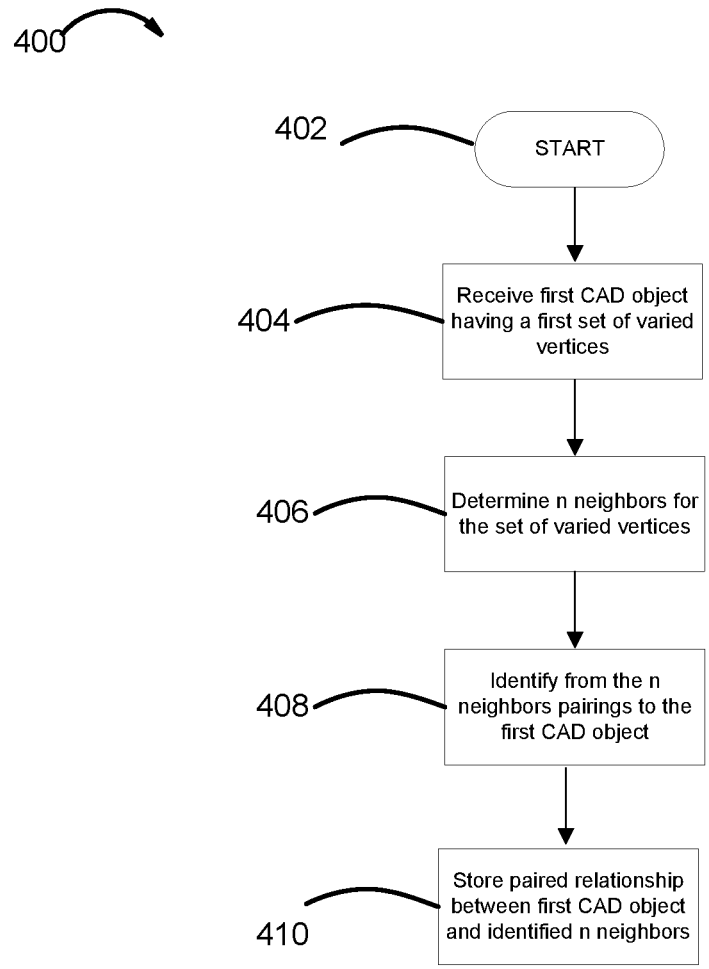
FIG. 4 is a flowchart illustrating a method of pairing CAD objects

FIG. 4 is a flowchart illustrating a method of pairing CAD objects. In step 404, a first CAD object is received adhering to a structural pattern. The CAD object belongs to a set of unique CAD objects that all adhere to the structural pattern though vary from one another in at least one aspect. The variation between each CAD object is based on geometric shape or size. The variation is defined by a set of varied vertices. The set of varied vertices may be localized to a zone or zones of the CAD object, and/or may be dispersed across the CAD object.

In step 406, the system determines n neighbors for the first CAD object based on the set of varied vertices. The figure for "n" is based on an implemented embodiment. Neighbors may be defined as "nearest neighbors" and focuses on the next "n" CAD objects of the set of CAD objects that have the most similar values for the first CAD object's set of varied vertices. In some embodiments, "most similar" may be based on a distance score. Neighbors may also be defined as those CAD objects from the set of CAD objects that have a respective set of varied vertices with values that fall within a threshold difference from the first CAD object's set of varied vertices (e.g., using a difference score).

An example of a manner in which to determine an overall distance score is to add a total Euclidean distance between each corresponding vertex between two sets of varied vertices. In some embodiments, a select subset of the set of varied vertices have a greater influence over a distance score between a two given CAD objects. For example, vertices that contribute to an aspect of the CAD object that have a greater influence on how the CAD object nests with other CAD objects (e.g., according to a machine learned model, nesting heuristics, etc. . . . ) may have a greater influence over a distance score (e.g., some vertices are weighted and have a greater/lesser contribution to the distance score). In some embodiments, the weighting is not a linear function. Non-linear weighting functions may result from logistical implications on a print cycle of creating a given like subset (e.g., as a result of fitting into a specified print area of a given 3D printer). In some embodiments, the distance score is evaluated as a threshold. In some embodiments, a heuristic determines whether objects are "like" one another and are subsequently able to be placed into like subsets based on satisfaction of the heuristic.

In step 408, the system identifies pairings for the first CAD object from the n neighbors. In some embodiments, identified pairings may be picked arbitrarily from the n neighbors. Alternatively, identified pairings are determined based on one or more factors including the repeating orientation pattern (e.g., the number of objects included in a repeating unit, or to serve a multi-tiered pattern), the size/shape of the print area of available printers, the physical location of available printers, or the end user shipping destination for the physical embodiment of the CAD object. In some embodiments, identified pairings are based on a hierarchical clustering model (e.g., as determined based on grouping techniques such as WPGMA/UPGMA, or other equivalents) In step 410, the system stores paired relationships between the first CAD object and identified n neighbors in memory.

Figure 5:
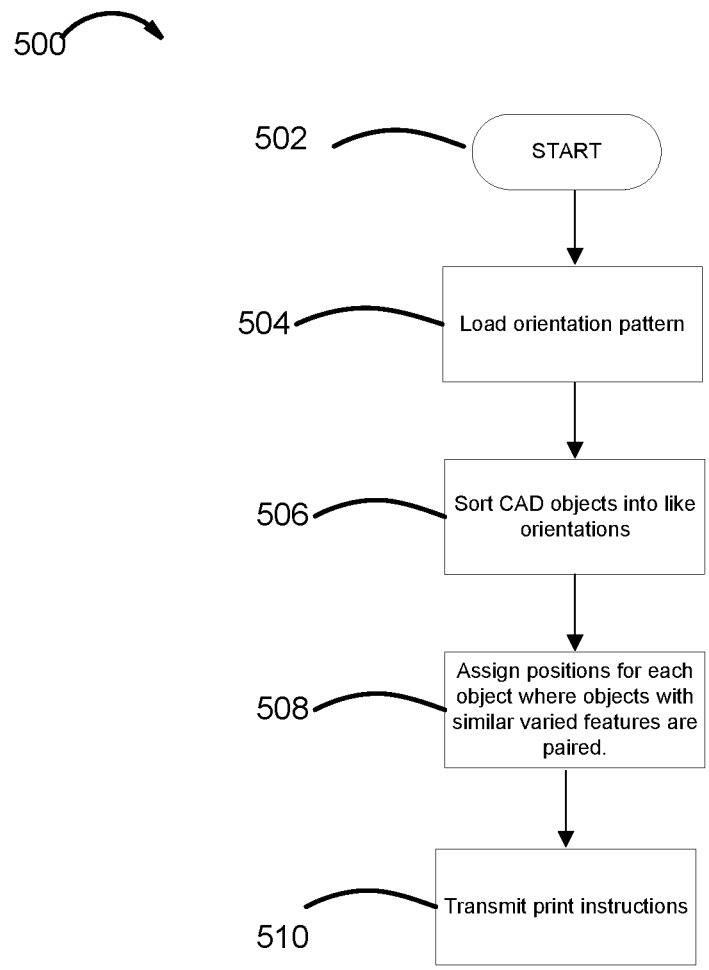
FIG. 5 is a flowchart illustrating a method of positioning CAD objects in a predetermined scheme.

FIG. 5 is a flowchart illustrating a method of positioning CAD objects in a predetermined scheme. In some embodiments, a given printing operation may print a single or a handful of types of CAD object adhering to a single structural pattern. In these circumstances the object need not be analyzed for general geometry and style/manner of variance before each print job. This information is known from previous iterations. Recomputing is a waste of computational resources. The repeating orientation pattern may be used from previous print jobs, or even hardcoded beforehand. For example, where a user knows that they will only be printing custom insoles and only custom insoles, there is gained efficiency from repetition.

In step 504, the system loads a relevant repeating orientation pattern. The orientation pattern loaded is based on the structural pattern of the CAD objects in a given print job. Following step 504, steps 506-510 are similar to steps 310 to 314 of FIG. 3 and some embodiments of step 508 include at least some of the steps of FIG. 4.

Figure 6:
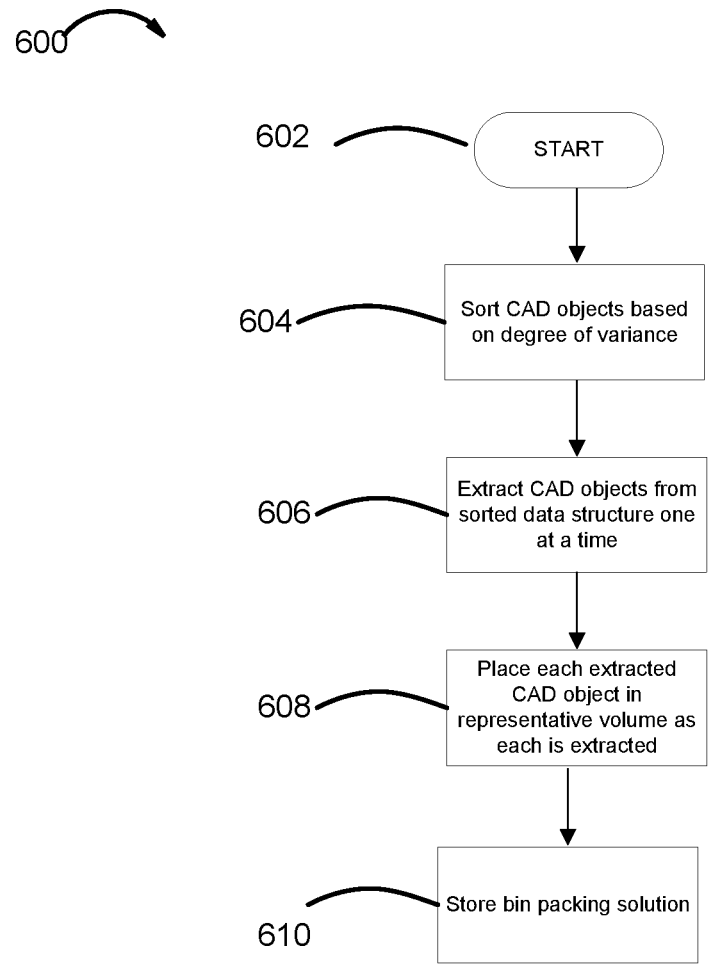
FIG. 6 is a flowchart illustrating a method of positioning like objects one at a time.

FIG. 6 is a flowchart illustrating a method of positioning like objects one at a time. In some embodiments, a repeating orientation pattern is not predetermined before placement of each CAD object. The system still sorts CAD objects based on degree of variance. However, once the CAD objects are sorted, the system places those CAD objects into a representative volume of a print area one at a time and based on an efficient placement according to the remaining volume. In the method illustrated in FIG. 6, the system does not calculate an overall plan for the set of CAD objects; however, computational complexity of bin packing is reduced over prior art methods based on the order the CAD objects are placed. The dataset of objects is organized in a way that significantly reduces the computational cost per placement.

In step 604, the system sorts CAD objects based on degree of variance from one another. Step 604 operates similarly to the method disclosed in FIG. 4, and Steps 310 and 312 of FIG. 3. In step 606, the system extracts CAD objects from a suitable sorted data structure (e.g., queue, stack, linked list, etc.) one at a time. The data structure used may queue for more than a single printer at a time, and thus multiple CAD objects are extracted in parallel. Where multiple objects are extracted in parallel, the CAD objects may be sorted into multiple exclusive data structures.

In step 608, the system places each extracted CAD object in a representative volume as each is extracted. The placement is performed according to best nesting principles (e.g., machine learned model, nesting heuristics, simulated annealing, etc.) and based on an evolving current status of remaining space in the representative volume. In step 610, the system stores the bin packing solution in memory.

Figure 7:
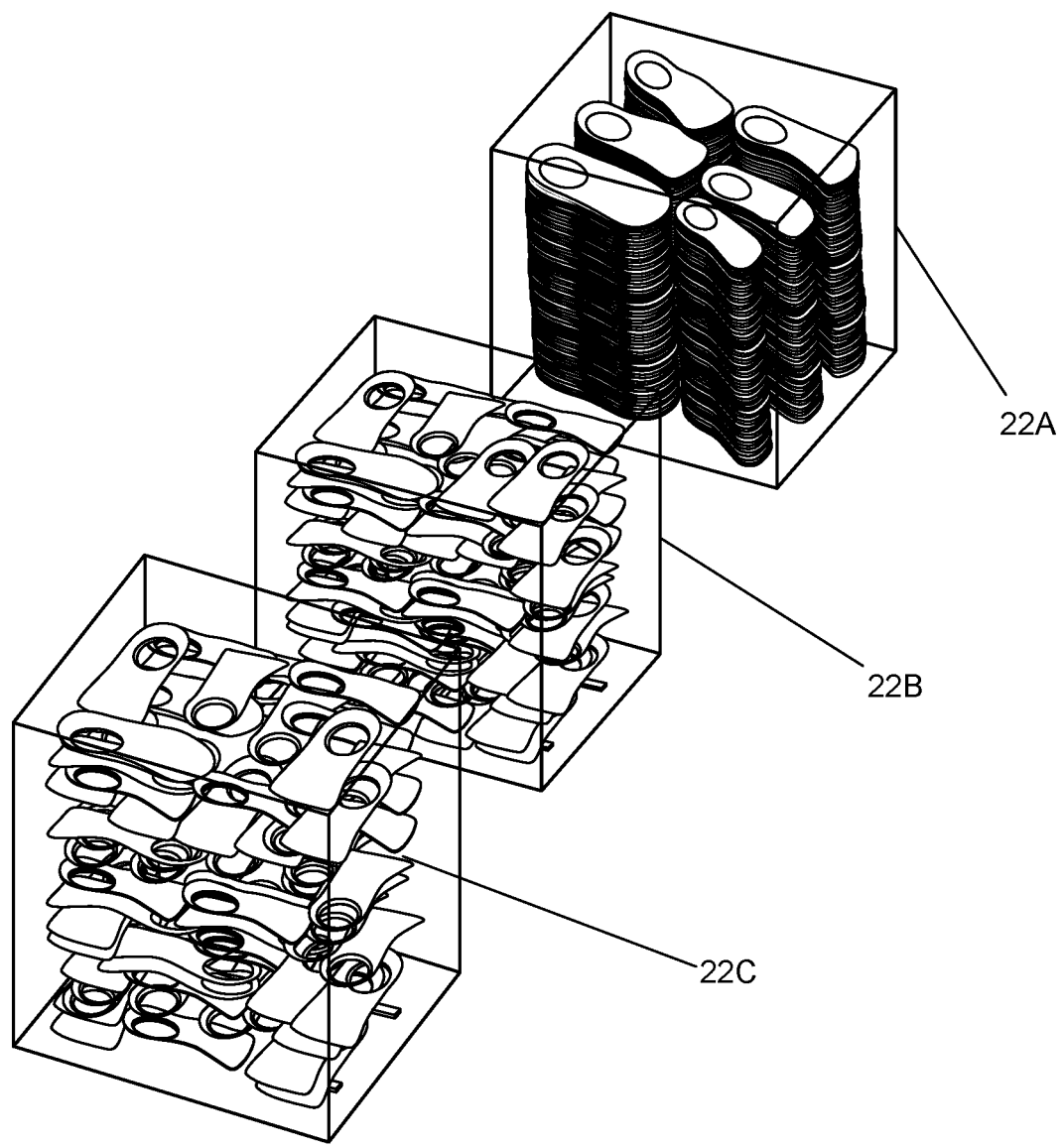
FIG. 7 is an illustration of a comparison between various nesting techniques.

FIG. 7 is an illustration of a nesting comparison between various nesting techniques. Illustrated are three identical representative volumes 22 each with a bin packing solution for a set of custom insole CAD objects 20. Volume 22A is "solved" using techniques disclosed herein operating on a single local machine. Volume 22B is "solved" using a prior art randomization technique operating on a fully parallelized server network ("cloud computing"). Volume 22C is "solved" using the prior art technique operating on a single local machine.

The disclosed technique operating on a single machine achieves a packing of one-hundred and fifty CAD objects 20 and is solved in approximately ten minutes. The prior art technique in the cloud platform only achieves a packing of ninety CAD objects 20 and is solved in approximately an hour. The single machine employing the prior art technique only packs eighty-two CAD objects 20 into the representative volume and requires two hours to solve. Accordingly, the disclosed technique achieves a significant advantage in both time and objects packed.

Figure 8:
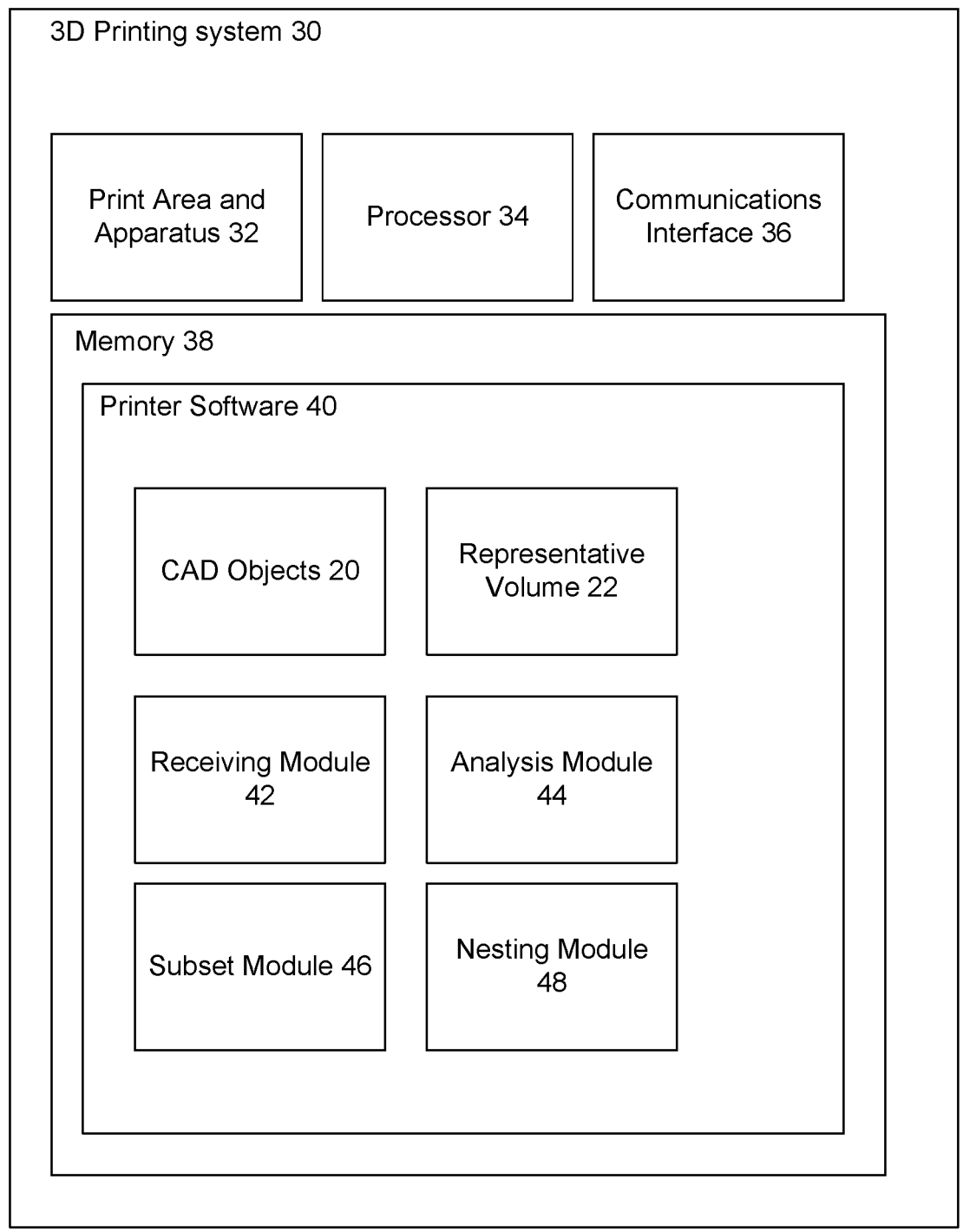
FIG. 8 is a block diagram of a 3D printing system.

FIG. 8 is a block diagram of a 3D printing system. The 3D printing system 30 includes a print area and apparatus 32, a processor 34, a communications interface 36, and a memory 38. The print area and apparatus 32 includes a physical space and a physical and electronic mechanism for generating objects through additive manufacturing. Examples include heated material extrusion and powder-based laser-sintering.

The memory 36 includes printer software 40 that includes CAD objects 20 and a representative volume 22 of the print area 32. The printer software 40 includes instructions that coordinate with the 3D printing system 30 and cause CAD objects 20 to be built as physical objects by the 3D printing system 30. The printer software 40 includes a receiving module 42 that receiving incoming CAD object orders, and batches them into print jobs. Batching into print jobs may be based any combination of time of receipt and structural pattern. The printer software 40 includes an analysis module 44 that analyzes the structural pattern and variance thereto of print jobs. The printer software 40 includes a subset module 46 that generates like subsets from the print jobs. The printer software 40 includes a nesting module 48 that manages repeating orientation patterns and assigns like subsets to particular print cycles, and particular positions within those print cycles.

Figure 9:
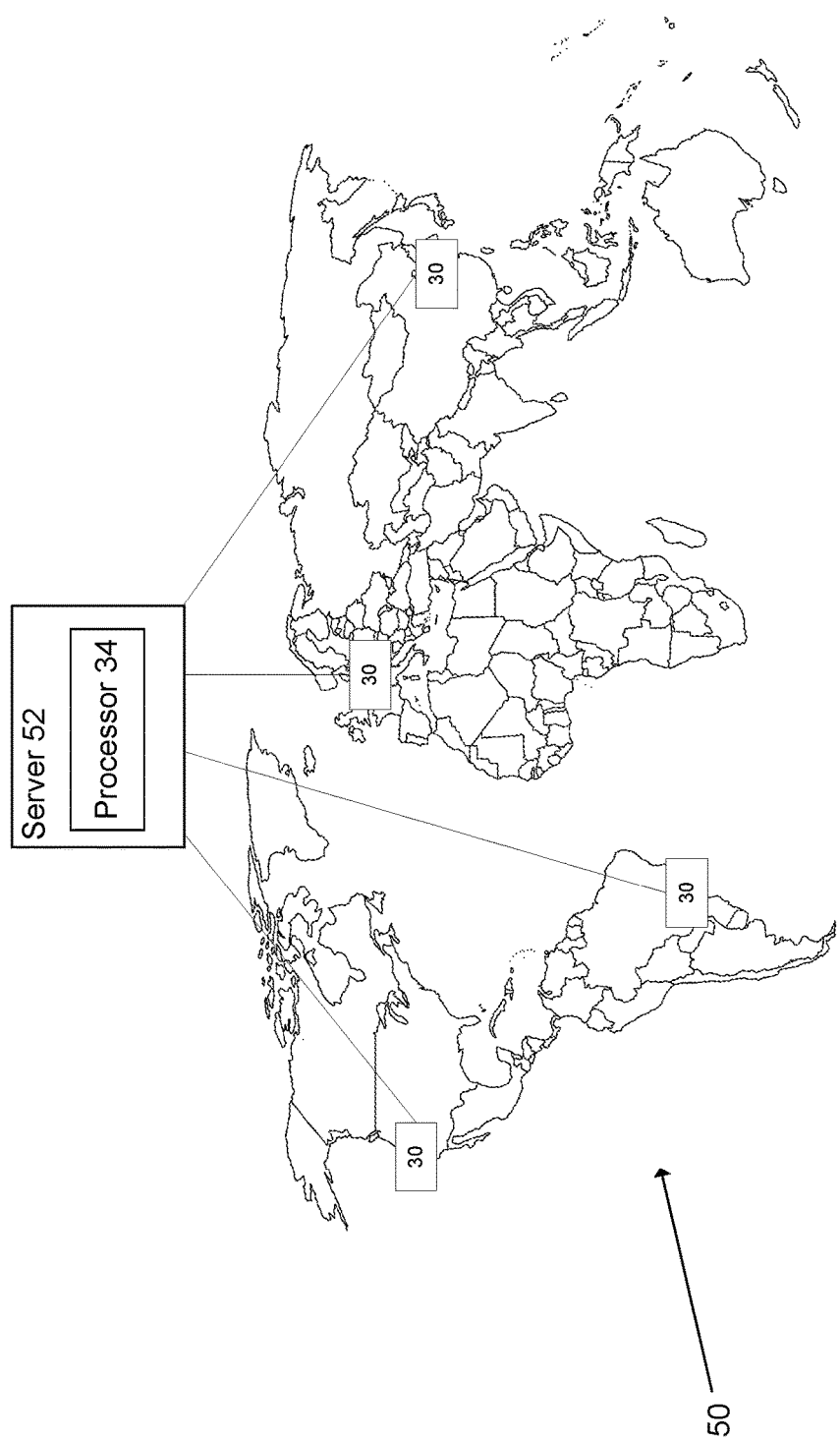
FIG. 9 is a block diagram of a network of 3D printing systems.

FIG. 9 is a block diagram of a network of 3D printing systems. A network of 3D printing systems 50 includes a number of individual 3D printing systems 30. Each of the individual 3D printing systems 30 has a specific physical location. The specific physical location may include a number of 3D printer systems 30 that are localized to a given location or region. In some embodiments the 3D printer systems 30 are spread around the country or world and communicate with a backend server 52 via a communication network such as the Internet.

The backend server 52 operates via use of a processor 34. The processor conducts print job distribution. In some embodiments, the processor 34 is part of a machine separate from the network of 3D printing systems 50. In some embodiments, the processor 34 that conducts print job distribution and coordination of production parameters may be included in the backend server 52, one of the 3D printers 30, or may include the use of multiple processors 34 distributed across the network of 3D printing systems 50. Currently, it is common to use computers separate from printers to control and direct printers; however, as processors become more powerful, a greater portion of the pre-processing of print jobs may be controlled on the printers themselves.

Figure 10:
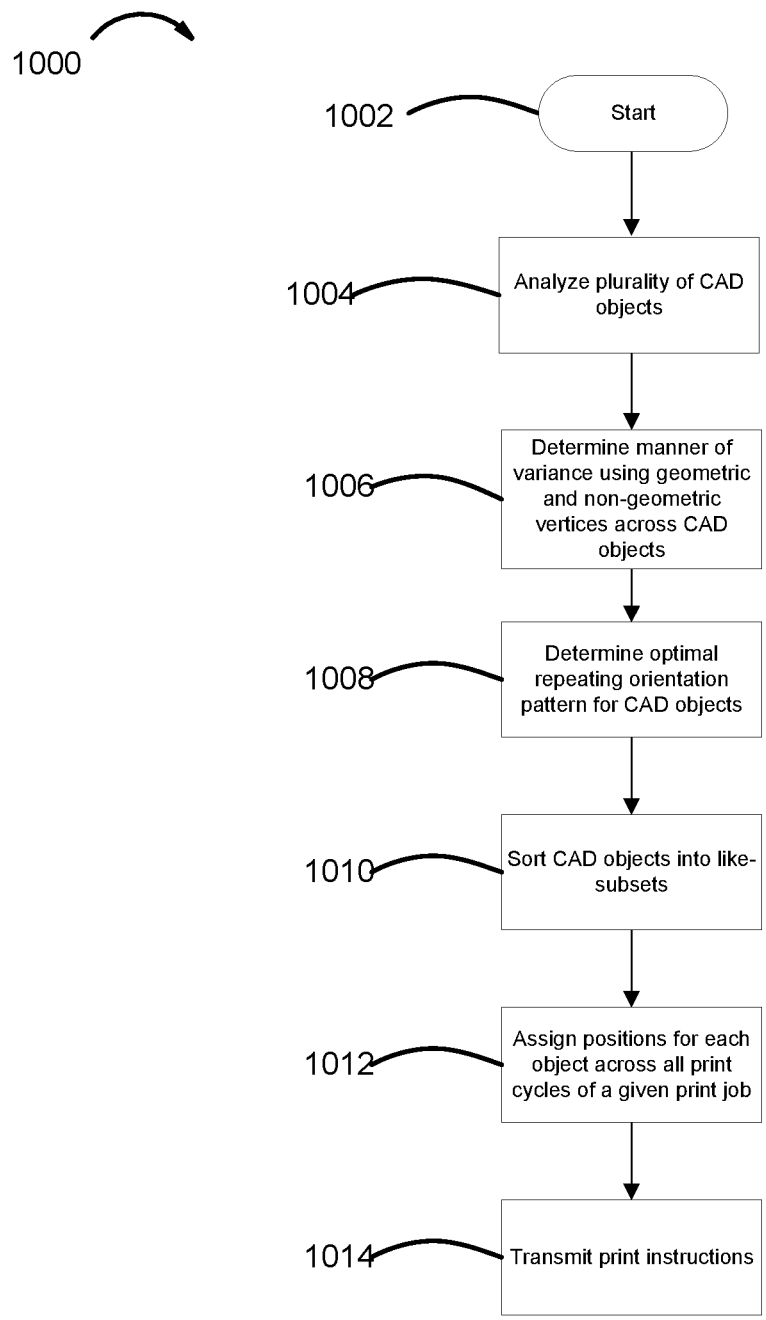
FIG. 10 is a flowchart illustrating a routing of print jobs to the network of 3D printers.

FIG. 10 is a flowchart illustrating routing of print jobs to the network of 3D printers. Using analytics of materials cost, printer speed, and units per print cycle, a per unit price can be determined for any item that the network of 3D printers generate. The per unit cost is generally made more optimal by the techniques disclosed herein. Improving print cycle density means faster printing and less print material wasted between cycles.

In some embodiments, 3D printed objects are made to order (e.g., custom orders for specific individuals). Specific individuals often have mailing addresses. As a result of the inclusion of specific mailing addresses, the price per unit may be made more optimal by way of the inclusion of shipping costs. Routing an order to a given 3D printing system that is closer to the mailing address of the order can improve price per unit further. While it is feasible for a correlation to exist between the degree of variance across a plurality of CAD objects and their respective shipping destinations, in many cases, such a correlation will not exist, and the factors are entirely independent of one another. Accordingly, the relevant factors shipping cost and optimal nesting strategies are weighted separately. Balancing these factors can, at times, be at odds.

For example, assigning two CAD objects that would otherwise be paired due to a low degree of variance to different printers (and thus, different print cycles) may reduce the overall packing efficiency of the print job (and increasing the cost per unit). However, if each of the two CAD objects is destined for opposite corners of the world, printing each at printers on either side of the world saves on shipping costs and reduces the price per unit. In another example, two similar CAD objects are destined for neighboring addresses. Thus, printing the two objects in the same printer and in the same print cycle is more optimal under both factors.

Increasing the total number of CAD objects across a given print job reduces the overall effect of one factor over the other (printing and shipping costs respectively). That is, the increasing the number of CAD objects there to print similarly increases the likelihood of finding a "like subset" of CAD objects that also have like shipping destinations.

In order to optimize on both the shipping and printing factors, the method proceeds very similarly as does the method of FIG. 3. However, Each CAD object includes an additional pseudo-vertex. The pseudo-vertex is not a geometric vertex, but a geographic one. The geographic vertex, representing the end shipping destination for the physical version of the CAD object can be evaluated for "like fit" in the same manner as the geometric vertices. The geographic vertex is weighted in a similar fashion as described in step 406 of FIG. 4. Notably, a Euclidean distance is not a relevant factor when comparing geographic vertices. Instead, a point to point shipping cost is used. The shipping cost is variable over time and is periodically updated by the system. A geometric vertex (that is, a vertex defining a geometric shape) and a geographic or otherwise "non-geometric" vertex (that is, a vertex designating a characteristic about a 3D object other than its respective geometric structure) each may be represented by an array of integers. Non-geometric vertices may be represented as a coordinate despite not belonging to a structural appearance of a CAD object.

An important distinction caused by the inclusion of a geographic vertex is that "like subsets" include both CAD objects and a paired 3D printing system (based on the printing system's physical location). That is, even if two CAD objects destined for the same location are paired together, efficiency is reduced where that pair is printed on the opposing side of the Earth from the shared destination. Thus, the comparison between the two CAD objects is made as "fit to a particular printer" in addition to fit to one another. In some embodiments, fit to a printer is not a static figure (unlike a geometric vertex). Fit to a printer can change, as a result of the printer changing. Consideration is made for CAD objects that have two components (e.g., a right and left insole).

In some embodiments, the subset module operates using a proposition-based greedy algorithm. A given CAD object has an initial preferred 3D printer based on shipping cost. During like subset generation, a subset can "propose" a different printer. The greedy choice comes from gained price-per-unit efficiency of the creation of the like subset. In some embodiments, the subset module uses vector analysis. Vectors represent members of a given subset, and the value of the vector determines efficiency of the given subset.

In some embodiments, the printer for a CAD object does not change. In such embodiments, where there is a large enough print order, the computation cost of optimizing two independent factors (printing and shipping costs) in requires too much time. Thus, a given CAD object is routed first to a 3D printer, or bank of 3D printers. Once routed, the CAD object is sorted into like subsets of CAD objects at that 3D printer or bank of 3D printers.

Determining like subsets for a number of CAD objects is based on a comparison of geometric vertices and non-geometric vertices (thus far described as a geographic vertex). The non-geometric vertices may take forms other than geographic. For example, other non-geometric vertices used may include: materials used (e.g., quality or character of the additive material used by the printer), after-printing processing (e.g., special packaging, assembly, or options applied after the CAD object becomes physical), and/or physical object color (note: the physical object color may be a choice of material used, or a post printing process). A given CAD object may have any number of the non-geometric vertices. Each non-geometric vertex is configured to include weighting. In some embodiments the weighting of the non-geometric vertices is based on that vertex's effect on per unit cost. Changes to the relevant distance score may not be linear due to non-linear changes in cost caused by reaching a threshold that forces some logistical choice.

The effect of non-geometric vertices on assignment of CAD objects is at the print cycle level. Where a number of printers are used, each having variable equipment, settings, and physical location, a cycle of a given printer will have the same variables across all CAD objects printed within the cycle. Geometric vertices influence the position of a given CAD object within the print area of a given print cycle, non-geometric vertices influence the print cycle in which the CAD object is included. Each like subset is printed using the same set of production parameters. For example, the production parameters of a given embodiment may include any combination of: physical location or region of the 3D printer or bank of printers used to print, a choice of material, a color of material used, a style of printer (e.g., laser sintering or material extrusion), a post-printing sorting procedure, a post-printing coloring procedure, or a post-printing packaging procedure.

In step 1004, a number of CAD objects belonging to a given print job are analyzed similarly to step 304. In step 1006, the system determines a manner and degree of variance across all CAD objects in the print job. Variance is expressed using geometric vertices (that are apparent when looking at a rendering of the CAD object) and non-geometric vertices (that are non-visible and stored with the CAD object as metadata).

In step 1008, the system determines a repeating orientation pattern as discussed with reference to FIG. 3 using the geometric vertices. In step 1010, the CAD objects are sorted into like subsets using both the geometric vertices and the non-geometric vertices. Inclusion into a like subset, causes each CAD object in the like subset to be included in the same print cycle. In step 1012, the CAD objects, in like subsets are positioned into positions in a repeating orientation pattern in specific print cycles (e.g., bottom right corner of the third cycle of printer A). In step 1014, the system transmits print instructions toward a print queue for the correct printer.

Figure 11:
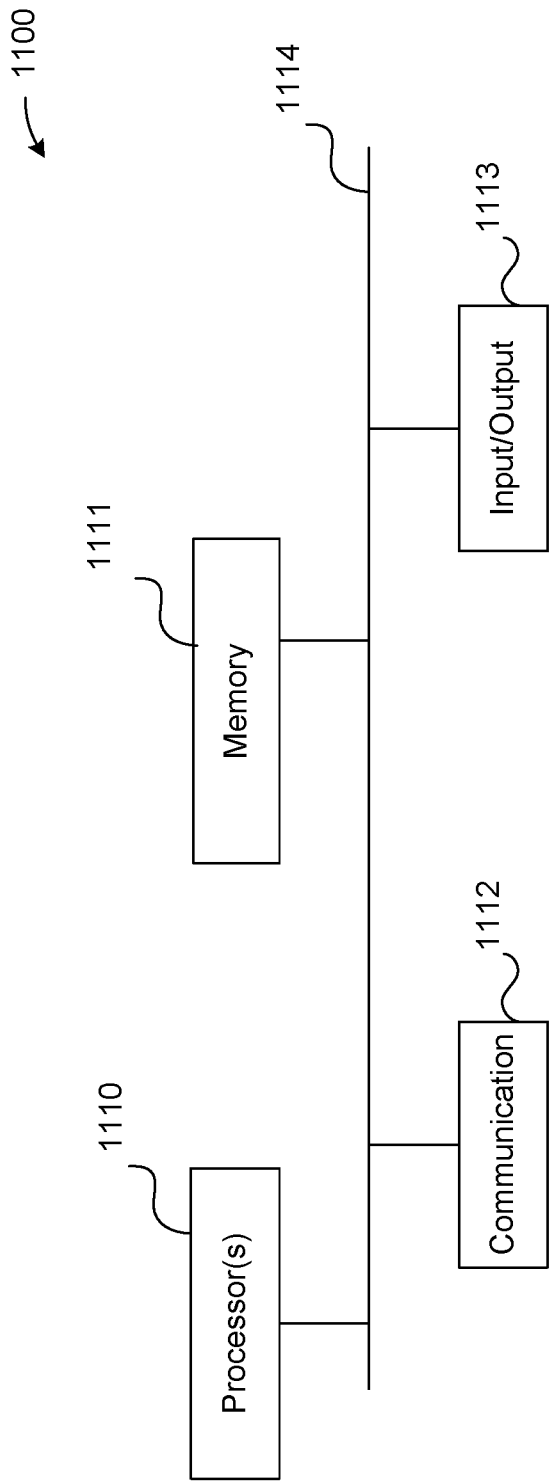
FIG. 11 is a high-level block diagram showing an example of a processing device that can represent a system to run any of the methods/algorithms described above

FIG. 11 is a high-level block diagram showing an example of a processing device 800 that can represent a system to run any of the methods/algorithms described above. A system may include two or more processing devices such as represented in FIG. 11, which may be coupled to each other via a network or multiple networks. A network can be referred to as a communication network.

In the illustrated embodiment, the processing device 1100 includes one or more processors 1110, memory 1111, a communication device 1112, and one or more input/output (I/O) devices 1113, all coupled to each other through an interconnect 1114. The interconnect 1114 may be or include one or more conductive traces, buses, point-to-point connections, controllers, scanners, adapters and/or other conventional connection devices. Each processor 810 may be or include, for example, one or more general-purpose programmable microprocessors or microprocessor cores, microcontrollers, application specific integrated circuits (ASICs), programmable gate arrays, or the like, or a combination of such devices. The processor(s) 810 control the overall operation of the processing device 1100. Memory 1111 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1111 may store data and instructions that configure the processor(s) 1110 to execute operations in accordance with the techniques described above. The communication device 1112 may be or include, for example, an Ethernet adapter, cable modem, Wi-Fi adapter, cellular transceiver, Bluetooth transceiver, or the like, or a combination thereof. Depending on the specific nature and purpose of the processing device 1100, the I/O devices 1113 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 1100 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
generating a repeating orientation pattern for packing a plurality of digital 3D objects into a volume that represents a print region of a 3D printer, wherein generation of said repeating orientation pattern prioritizes volumetric efficiency in packing the plurality of digital 3D objects into the volume, wherein the plurality of digital 3D objects have in common a structural pattern, and wherein at least some of the plurality of digital 3D objects have a different size or shape from one another, the repeating orientation pattern generated by:
  simulating a plurality of orientation schemes of representative digital objects of the plurality of digital 3D objects in digital space, each orientation schemes including a number of the representative digital objects positioned in relation to one another;
  evaluating volumetric requirements for each orientation scheme; and
  identifying an orientation scheme that prioritizes volumetric efficiency to use as the repeating orientation pattern; and assigning each of the plurality of digital 3D objects to a corresponding position in the repeating orientation pattern, wherein 3D digital objects are assigned positions in the repeating orientation pattern based on similarity of variation from the structural pattern.

2. The method of claim 1, wherein said simulating is iterated a number of times, and wherein each iteration increases a number of the representative digital objects that are positioned respective of one another.

3. The method of claim 1, further comprising:
assigning each of the plurality of digital 3D objects to a like subset of a plurality of like subsets, wherein a like subset is a subset of the plurality of digital 3D objects including a number of digital 3D objects found in an iteration of the repeating orientation pattern; and
wherein said assigning each of the plurality of digital 3D objects to the corresponding position in the repeating orientation pattern is performed by positioning the plurality of like subset as a unit, one like subset at a time.

4. The method of claim 1, further comprising:
sorting each of the plurality of digital 3D objects into pairs based on similarity of variation from the structural pattern between a first digital 3D object and a second digital 3D object included in each pair respectively; and
wherein said assigning each of the plurality of digital 3D objects to the corresponding position in the repeating orientation pattern is performed by positioning each of the pairs as a unit, one pair at a time.

5. The method of claim 1, further comprising:
sorting the plurality of digital 3D objects in order of placement into the volume corresponding to a print region of a 3D printer based on adherence to the repeating orientation pattern.

6. The method of claim 1, wherein the position in the repeating orientation pattern includes a spatial location in the volume corresponding to a print region of a 3D printer and a particular print cycle of the 3D printer.

7. The method of claim 1, wherein the repeating orientation pattern is a column of digital 3D objects stacked one on top of another in parallel alignment, and the repeating orientation pattern is repeated within the volume corresponding to a print region of a 3D printer a number of times.

8. The method of claim 1, wherein the repeating orientation pattern is stacking digital 3D objects one on top of another in parallel alignment and alternating descending and ascending width of stacks.

9. The method of claim 1, wherein each respective digital 3D object includes a partner 3D object that is complementary to the respective digital 3D object and is included within the same print cycle.

10. The method of claim 1, further comprising:
determining a geometric profile of the structural pattern and a common style of deviation from the structural pattern across the plurality of digital 3D objects.

11. The method of claim 10, wherein said determining the repeating orientation pattern is based on the geometric profile of the structural pattern and the common style of deviation from the structural pattern.

12. The method of claim 11, wherein the geometric profile or deviation from the structural pattern is used to match convex surfaces of digital 3D objects to concave surfaces of adjacent digital 3D objects.

13. The method of claim 1, wherein the repeating orientation pattern extends across a number of print cycles of the 3D printer.

14. The method of claim 13, wherein each digital 3D object includes metadata describing a non-geometric parameter, and said assigning each of the plurality of digital 3D objects to the corresponding position in the repeating orientation pattern is further based on a similarity between the non-geometric parameter across the plurality of digital 3D objects.

15. The method of claim 1, wherein 3D digital objects that have greater similarity of variation from the structural pattern are assigned positions in the repeating orientation pattern more proximate to one another than 3D digital objects that have lesser similarity of variation from the structural pattern; and
assigning each of the plurality of digital 3D objects to a corresponding position.

16. A method comprising:
pairing a first digital object and a second digital object of a plurality of 3D digital objects, wherein the plurality of 3D digital objects have in common a structural pattern and vary in shape or size from one another, and said pairing is in response to a determination that the first digital object and the second digital object satisfy a specified shape or size similarity criterion relative to each other, wherein the specified shade similarity criterion is based on a degree of variance from the structural pattern; and
positioning the first digital object adjacent to the second digital object in a volume corresponding to a print region of a 3D printer.

17. The method of 16, wherein said positioning is according to a specified repeating orientation pattern.

18. A system comprising:
a memory that stores a 3D print volume for use by a 3D printer; and
a processor configured to access data representing a plurality of digital 3D objects to be 3D printed, all of the plurality of digital 3D objects having in common a structural pattern, at least some of the plurality of digital 3D objects differing from each other in size or shape, the processor further configured to define a plurality of groups of the digital 3D objects, such that all of the 3D digital objects within each group satisfy a specified similarity criterion, relative to each other, for variation from the structural patter, the processor further configured to assign each of the plurality of digital 3D objects to a corresponding position in the 3D print volume, according to a repeating orientation pattern, based on the defined plurality of groups, wherein the processor is configured to generate the repeating orientation pattern by:
simulating a plurality of orientation permutations of representative digital objects of the plurality of digital 3D objects in digital space, each orientation permutation including a number of the representative digital objects positioned in relation to one another, and evaluate volumetric requirements for each orientation permutation; and
identify an orientation scheme that prioritizes volumetric efficiency to use as the repeating orientation pattern.

19. The system of claim 18, wherein said simulating is iterated a number of times wherein each iteration increases the number of the representative digital objects positioned respective of one another.

20. The system of claim 18, where the processor is further configured to determine a geometric profile of the structural pattern and a common style of deviation from the structural pattern across the plurality of digital 3D objects.

21. The system of claim 20, wherein said determination of the repeating orientation pattern is based on the geometric profile of the structural pattern and the common style of deviation from the structural pattern.

22. The system of claim 21, wherein the geometric profile or deviation from the structural pattern is used to match convex surfaces of digital 3D objects to concave surfaces of adjacent digital 3D objects.

23. A method comprising:
accessing data representing a plurality of 3D digital objects to be produced by a 3D printing process, the plurality of 3D digital objects having in common a structural pattern, at least some of the plurality of 3D digital objects varying in shape from one another;
determining whether a first digital object and a second digital object of the plurality of 3D digital objects satisfy a defined degree of shape variation criterion; and
in response to a determination that the first digital object and the second digital object satisfy the defined shape degree of variation criterion, assigning the first digital object and the second digital object to positions adjacent to each other within a print region of a 3D printer.

24. The method of claim 23, wherein the defined degree of shape variation criterion is evaluated using a heuristic that compares a first set of dimensions of the first digital object to a second set of dimensions of the second digital object that correspond according to the common structural pattern.

25. The method of claim 23, wherein the defined degree of shape variation criterion is evaluated using a distance of the first object and second object from a representative object.

26. The method of claim 23, wherein the defined degree of shape variation criterion is evaluated using a comparison of surfaces of the first object and second object to surfaces of previously positioned objects.

27. The method of claim 23, wherein orientation of the first object and the second object with respect to one another is based on a previously used orientation of objects having the same common a structural pattern as the first object and the second object.

* * * * *

UNITED STATES PATENT AND TRADEMARK OFFICE
CERTIFICATE OF CORRECTION

PATENT NO. : 10,552,095 B1
APPLICATION NO. : 16/192762
DATED : February 4, 2020
INVENTOR(S) : Colin M. Lawson et al.

Page 1 of 1

It is certified that error appears in the above-identified patent and that said Letters Patent is hereby corrected as shown below:

On the Title Page

(72) Inventors: Please change "Shamil N. Hargovan" to read --Shamil Hargovan--.

Signed and Sealed this
Seventh Day of April, 2020

Andrei Iancu
*Director of the United States Patent and Trademark Office*